United States Patent
Ying

(10) Patent No.: US 9,656,688 B2
(45) Date of Patent: May 23, 2017

(54) ALL-ATTITUDE HUMAN-MACHINE INTERACTION VEHICLE

(71) Applicant: HANGZHOU CHIC INTELLIGENT TECHNOLOGY CO., LTD, Hangzhou (CN)

(72) Inventor: Jiawei Ying, Hangzhou (CN)

(73) Assignee: HANGZHOU CHIC INTELLIGENT TECHNOLOGY CO., LTD, Hangzhou, Zhejiang Province (CN)

( * ) Notice: Subject to any disclaimer, the term of this patent is extended or adjusted under 35 U.S.C. 154(b) by 0 days.

(21) Appl. No.: 15/193,856

(22) Filed: Jun. 27, 2016

(65) Prior Publication Data

US 2017/0101129 A1 Apr. 13, 2017

(30) Foreign Application Priority Data

Oct. 10, 2015 (CN) .......................... 2015 1 0651451

(51) Int. Cl.
| | | |
|---|---|---|
| *B60R 22/00* | (2006.01) | |
| *B62D 11/00* | (2006.01) | |
| *B62D 51/02* | (2006.01) | |
| *B62K 3/00* | (2006.01) | |
| *B62D 11/02* | (2006.01) | |

(52) U.S. Cl.
CPC ............ *B62D 11/003* (2013.01); *B62D 11/02* (2013.01); *B62D 51/02* (2013.01); *B62K 3/007* (2013.01)

(58) Field of Classification Search
USPC .......................................................... 701/49
See application file for complete search history.

(56) References Cited

U.S. PATENT DOCUMENTS

| | | |
|---|---|---|
| 5,701,965 A | 12/1997 | Kamen et al. |
| 6,302,230 B1 | 10/2001 | Kamen et al. |
| 7,174,976 B2 | 2/2007 | Kamen et al. |
| 7,363,993 B2 | 4/2008 | Ishii |
| 7,481,291 B2 * | 1/2009 | Nishikawa ............ B62K 3/007 180/181 |

(Continued)

FOREIGN PATENT DOCUMENTS

| | | |
|---|---|---|
| CN | 203381739 U | 1/2014 |
| JP | 3981733 B2 | 7/2007 |

OTHER PUBLICATIONS

English translation of JP3981733 B2.
Espacenet English abstract of CN 203381739 U.

*Primary Examiner* — Hussein A. Elchanti
(74) *Attorney, Agent, or Firm* — Ladas & Parry LLP

(57) ABSTRACT

An all-attitude human-machine interaction vehicle is disclosed. The all-attitude human-machine interaction vehicle includes a vehicle body and two wheels coupled with the vehicle body. The vehicle body includes a support frame, a pedal disposed on the support frame, a first position sensor, and a controller. The first position sensor is configured to detect attitude information of a user standing on the pedal. The controller is configured to drive the wheels to rotate according to the attitude information. The all-attitude human-machine interaction vehicle can detect attitude information of a user standing on the pedal and drive the wheels to rotate according to the attitude information. Furthermore, sitting or even standing on one foot, the user can still manipulate the all-attitude human-machine interaction vehicle, which further adds to the fun in manipulation.

19 Claims, 5 Drawing Sheets

(56) References Cited

U.S. PATENT DOCUMENTS

| | | |
|---|---|---|
| 7,789,174 B2 | 9/2010 | Kamen et al. |
| 8,738,278 B2* | 5/2014 | Chen ............... B62K 3/007 180/218 |
| 8,925,657 B2 | 1/2015 | Kamen et al. |
| 9,376,155 B2* | 6/2016 | Ying ............... B62K 3/007 |
| 2004/0063556 A1* | 4/2004 | Wischusen ......... A63B 21/0004 482/148 |
| 2009/0288900 A1* | 11/2009 | Takenaka ............ B62K 3/007 180/218 |
| 2012/0166048 A1 | 6/2012 | Inoue et al. |
| 2015/0046002 A1* | 2/2015 | Shih .................. B62K 1/00 701/22 |
| 2015/0096820 A1* | 4/2015 | Strack .............. G11C 7/1072 180/181 |

* cited by examiner

ALL-ATTITUDE HUMAN-MACHINE INTERACTION VEHICLE

CROSS-REFERENCE TO RELATED APPLICATIONS

This application claims the priority of Chinese patent application numbers 201510651451.6, filed on Oct. 10, 2015, the entire contents of which are incorporated herein by reference.

FIELD OF THE DISCLOSURE

The present disclosure relates to human-machine interaction vehicles, and more particularly, to an all-attitude human-machine interaction vehicle.

BACKGROUND OF THE DISCLOSURE

Human-machine interaction vehicles, also called body feeling vehicles or sensor controlled vehicles, generally work based on a basic principle of "dynamic stabilization". In a vehicle body of a human-machine interaction vehicle a gyroscope may cooperate with an accelerometer to detect change of the vehicle body' attitude, and a servo control system can precisely control the vehicle body to adjust its posture, thereby balancing the vehicle.

The human-machine interaction vehicles generally fall into two categories, with and without a handle bar. In particular, a human-machine interaction vehicle with a handle bar can be manipulated to move forward, move backward, and take turns by controlling the handle bar. A human-machine interaction vehicle without a handle bar can move forward and backward by tilting the vehicle body, and can take turns by rotating two pedals by user's feet. An example of a human-machine interaction vehicle without a handle bar can be a two-wheel human-machine interaction vehicle disclosed by Chinese Patent Application No. CN201320300947. The two-wheel vehicle includes a left internal cover and a right internal cover symmetric with each other. The left internal cover is rotatably connected to the right internal cover.

To drive the two-wheel human-machine interaction vehicle, it may require that two feet each standing on the left internal cover or the right internal cover. However, when sitting or standing on one foot, the user may not be able to effectively manipulate the human-machine interaction vehicle to work, which reduces the fun in manipulation.

SUMMARY OF THE DISCLOSURE

To solve the above-mentioned problem, an all-attitude human-machine interaction vehicle is provided.

An all-attitude human-machine interaction vehicle is disclosed. The all-attitude human-machine interaction vehicle may include a vehicle body and two wheels coupled with the vehicle body. The vehicle body may include a support frame, a pedal disposed on the support frame, a first position sensor, and a controller. The first position sensor may be configured to detect attitude information of a user standing on the pedal. The controller may be configured to drive the wheels to rotate according to the attitude information.

The support frame may define a single pedal area which is away from the ground, and the pedal is loosely disposed in the pedal area.

The first position sensor may be a pressure sensor which may detect the attitude information of the user standing on the pedal by detecting pressures exerted on different parts of the pressure sensor.

The first position sensor may be arranged between the pedal and the support frame, and the pedal can be swayed about the first position sensor such that opposite ends of the pedal approach or leave from the support frame, respectively.

The first position sensor may be a flexible structure configured to detect the attitude information of the user standing on the pedal by detecting deformation amounts at different orientation of the flexible structure.

The pedal area may be a receiving groove recessed towards an inside of the support frame. A protrusion may be provided at each side of the pedal, facing towards the wheels and being pivoted to the vehicle body.

The vehicle body may further include a plurality of flexible supports arranged between the pedal and a bottom of the receiving groove.

The support frame may be sheathed in the pedal.

The support frame may be a rigid shaft, and opposite ends of the rigid shaft may be rotatably connected to the two wheels.

The first position sensor may be arranged between the pedal and the support frame, and be configured to detect a rotation angle of the pedal relative to the rigid shaft.

The vehicle body may further include at least two flexible supports arranged between the pedal and the support frame. The first position sensor may be configured to detect the deformation of the flexible supports in order to detect the attitude information of the user standing on the pedal.

The pedal may be rotatably connected to the support frame about a shaft which is arranged to be substantially a perpendicular bisector of an axis of the support frame facing the wheels, and the first position sensor may be configured to detect rotation information of the pedal about the axis of the support frame.

The vehicle body may further include a second position sensor configured to detect a tilt angle of the support frame relative to the ground. The controller may drive the all-attitude human-machine interaction vehicle to move forward or backward based on the tilt angle detected by the second position sensor, and drive the all-attitude human-machine interaction vehicle to take turns based on the rotation information detected by the first position sensor.

The first position sensor may be a tracking ball, similar to a mouse tracking ball, placed into a space formed by the pedal and the support frame. The tracking ball can roll in arbitrary directions in the space, and the attitude information of the user standing on the pedal can be detected by detecting a relative position of the tracking ball with respect to the pedal.

The two wheels may be rotatably assembled to opposite sides of the support frame and planes of the two wheels may be parallel with each other.

An inductive switch may be arranged in the pedal area and be configured to detect whether the pedal is pressed or not according as to control the wheels to rotate or stop.

The inductive switch may include a pressure sensor and a photoelectric sensor, both can detect whether the pedal is pressed or not.

The vehicle body may further include a power source and an actuation device. The power source is configured to supply electrical energy to the actuation device, the first position sensor, and the controller. The controller is configured to control the power source, the driving device, and the first position sensor, and to send an actuation signal to the actuation device based on attitude information detected by the first position sensor, to drive the wheels to rotate.

Another all-attitude human-machine interaction vehicle is disclosed. The all-attitude human-machine interaction vehicle may include a vehicle body and two wheels coupled with the vehicle body. The vehicle body may include a support frame, a first position sensor, and a controller. The support frame may be an unitary structure and be coupled with the wheels. The support frame may define a single pedal area. The first position sensor may be configured to detect attitude information of a user standing in the pedal area, and the controller may drive the wheels to rotate according to the attitude information.

Yet another all-attitude human-machine interaction vehicle is disclosed. The all-attitude human-machine interaction vehicle may include a vehicle body and two wheels coupled with the vehicle body. The vehicle body may include a support frame, a pedal disposed on the support frame, a first position sensor, and a controller. The support frame may be coupled with the wheels. The first position sensor may be configured to detect attitude information of a user standing on the pedal by detecting movement of the pedal, and the controller may drive the wheels to rotate according to the attitude information.

The above all-attitude human-machine interaction vehicles may have the following advantages.

The all-attitude human-machine interaction vehicle can detect attitude information of a user standing on the pedal and drive the wheels to rotate according to the attitude information. More to the point, sitting or even standing on one foot, the user can still manipulate the all-attitude human-machine interaction vehicle effectively, which adds to the fun in manipulation.

BRIEF DESCRIPTION OF THE DRAWINGS

References are made to the accompanying drawing(s) to better illustrate the present invention. However, the accompanying drawings represents only some embodiments of the disclosure, and are not meant to be exhaustive.

DETAILED DESCRIPTION OF THE DISCLOSURE

The following description will render a clear and complete description of the present disclosure in combination with the embodiments and accompanying drawings. Obviously, the embodiments described herein are only part but not all embodiments of the disclosure. Any other embodiments obtained by those of skill in the art without making inventive efforts shall all be covered within the protection of the disclosure.

Figure 1:
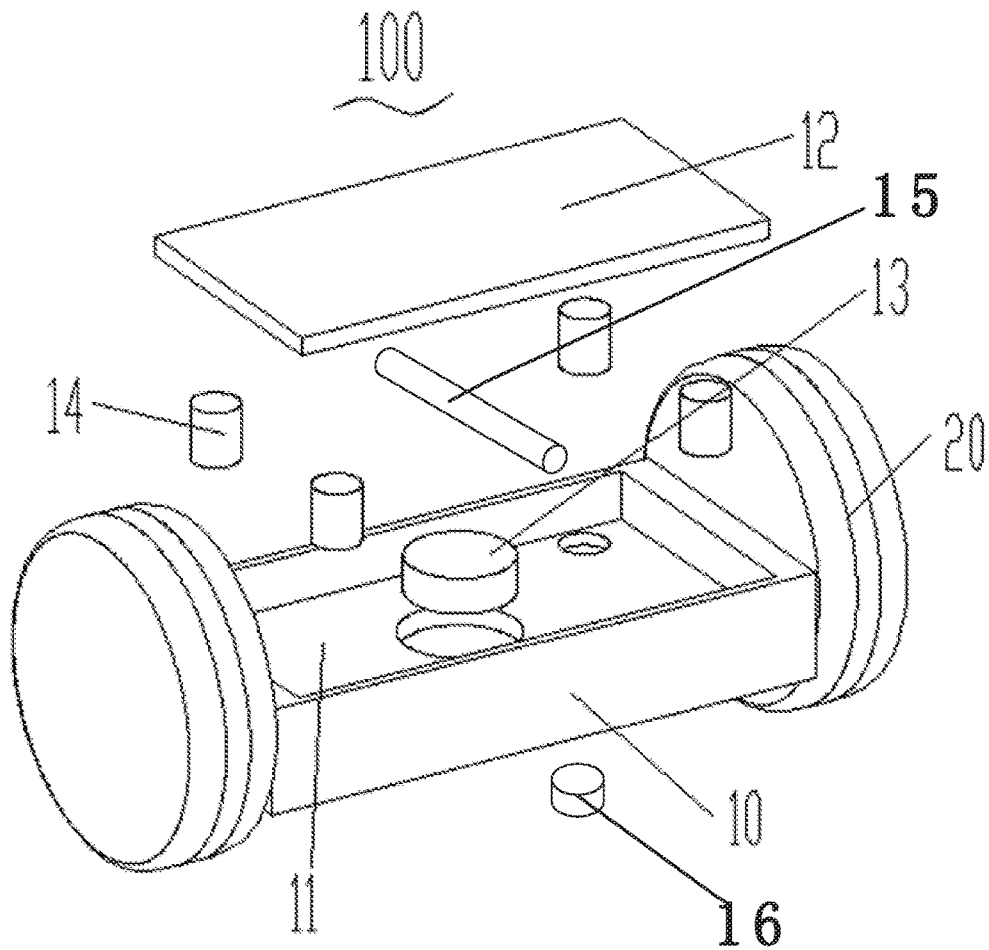
FIG. 1 is an exploded diagram of an all-attitude human-machine interaction vehicle according to an exemplary embodiment of the disclosure.

Referring to FIG. 1, an all-attitude human-machine interaction vehicle 100, according an exemplary embodiment of the present disclosure, includes a vehicle body 10 and two wheels 20 coupled with the vehicle body 10.

Typically, planes of the two wheels 20 may be parallel with each other, and axles of the two wheels 20 may be aligned in substantially a same imaginary straight line. The two wheels 20 may be assembled to opposite sides of the vehicle body 10 through the respective axles. For example, the two wheels 20 may be assembled to opposite ends of the vehicle body 10, respectively, or assembled at two sides under the vehicle body 10. In this embodiment, the two wheels 20 may be rotatably coupled with opposite ends of the vehicle body 10. The two wheels 20 can rotate about an axis of the vehicle body 10, which may substantially coincide with the above imaginary straight line, thereby enabling movement of the all-attitude human-machine interaction vehicle 100.

Also referring to FIGS. 2A, 2B, 2C, 3A, 3B, 3C, the vehicle body 10 may include a support frame 11, a pedal 12 disposed on the support frame 11, a first position sensor 13, and a controller 16. The support frame 11 may define a single pedal area which is away from the ground. The pedal 12 may be arranged in the pedal area. The first position sensor 13 may detect attitude information of a user standing on the pedal 12, and send the attitude information to the controller 16. The controller 16 may thus control the wheels 20 to rotate according to the attitude information, so that the user can manipulate the all-attitude human-machine interaction vehicle 100 to move forward (shown in FIG. 2B) and backward (shown in FIG. 2C), or take turns (shown in FIG. 3B or FIG. 3C), like turn right or turn left. The attitude information may include posture information of the user standing on the pedal 12. In this embodiment, the support frame 11 may be formed into an unitary structure and be rotatably coupled with the two wheels 20. By unitary structure, it may mean that the constituent parts of the support frame 11 cannot be moved with respect to each other such that the support frame is substantially an integral piece, which is different from the prior art that in a conventional human-machine interaction vehicle a left internal cover can be rotated relative to the right internal cover. The support frame 11 can be formed into an unitary structure by molding, welding, or riveting. The support frame 11 can be of any shape, such as a rigid plate-type structure or a rigid shaft. In this embodiment, the support frame 11 can be a rigid plate-type structure.

The pedal 12 may be independently mounted on the support frame 11. By "Independently mounted", it may mean that the pedal 12 is not fixedly disposed on the support frame, but to a certain extent loosely assembled to the support frame through intermediate connections such that the pedal 12 can move relative to the support frame 11. For example, the pedal 12 can be rotatably connected to the support frame 11 through a shaft 15, a hinge, or a universal joint. When a shaft 15 or a hinge is applied, the pedal 12 can only rotate about the shaft 15 or a hinge axis with respect to the support frame 11, otherwise when a universal joint is applied, the pedal 12 can pivot around the universal joint in arbitrary directions. In both cases, a control signal can be generated from the rotation or movement of the pedal 12 and thus be sent to the controller 16 to manipulate the motion of the all-attitude human-machine interaction vehicle 100. However, it should be noted that the connection between the pedal 12 and the support frame 11 is by no means limited to the above connection methods, any connections by which the pedal 12 can be moved relative to the support frame 11 can be applied. In this embodiment, the pedal 12 may be rotatably connected to the support frame 11 about the shaft 15, which is substantially a perpendicular bisector of the above defined axis of the support frame 11. Thus, when the user stands on the pedal 12, the pedal 12 can be rotated relative to the support frame 11 to form a left- or right-tilt angle. The pedal 12 can be of any shape. In this embodiment, the pedal 12 is an integral plate-type structure. Referring to FIGS. 2B, 2C, 3B, and 3C, the human-machine interaction vehicle moves forward or backward when there is a first difference in height on the pedal 12 along the shaft 15, and the human-machine interaction vehicle takes turns when there is a second difference in height on the pedal 12 along a direction perpendicular to the shaft 15.

The first position sensor 13 may be configured to detect attitude information of the user standing on the pedal 12. It should be appreciated that the first position sensor 13 can control multiple motions of the wheels 20, not merely rotation. For example, the first position sensor 13 can detect a left-tilt angle, a right-tilt angle, or a vertical position difference of opposite ends of the pedal 12 (the opposite ends refer to the ends pointing to the respective wheels 20, and the vertical position difference may be calculated by taking the plane of the support frame 11 as a reference horizontal plane). For example, if the left-tilt angle, the right-tilt angle, or the vertical position difference is close to zero, the all-attitude human-machine interaction vehicle 100 would move forward or backward in a substantially straight line. If the left-title angel or the vertical position difference is relatively large, the all-attitude human-machine interaction vehicle 100 may turn left. Specifically, the magnitude of the left-tilt angle, the right-tilt angle, or the vertical position difference to trigger the turning motion can depend on the user's preference. For example, some user may prefer the turning-trigger mechanism to be more sensitive, then the triggering magnitude of the tilt angles or the position difference can be set to be smaller. The human-machine interaction vehicle moves forward or backward when there is a first tilt angle between the pedal 12 and an imaginary axis of the wheels 20, and the human-machine interaction vehicle takes turns when there is a second tilt angle between the pedal 12 and the shaft 15.

The first position sensor 13 can be any type of position sensors, for example, a gyroscope, a photoelectric sensor, or a pressure sensor. The mounting position and number of the first position sensor 13 can be arbitrary according to actual design requirements. For example, there may be one or more first position sensors 13. In this embodiment, the first position sensor 13 can be a pressure sensor, which can detect the attitude information of the user standing on the pedal 12 by detecting pressures exerted on different parts of the first position sensor 13. The first position sensor 13 can be arranged between the pedal 12 and the support frame 11. For example, the first position sensor 13 can be integrated into the shaft 15 or a universal joint, against which the pedal 12 can sway about such that two opposite ends of the pedal 12 can approach or leave from the support frame 11. Typically, the first position sensor 13 can be a flexible structure, which can detect the attitude information of the user standing on the pedal 12 by detecting deformation amounts at different orientations of the first position sensor 13. Accordingly, the pedal 12 can be pivoted to the pedal area of the support frame 11 so that the first position sensor 13 can easily detect the deformation amounts at different orientations on the pedal 12. Specifically, the pedal area may be a receiving groove which is recessed toward an inside of the support frame 11. A protrusion (not shown) may be provided at each side of the pedal 12, facing towards the respective wheels 20. The protrusions may be pivoted to the vehicle body 10, so that the pedal 12 can be rotatably connected to the support frame 11. Alternatively, the pedal area can also be a flat plane instead of the receiving groove, in which case the support frame 11 may be sheathed in the pedal 12.

The first position sensor 13 can also employ other approaches to detect the attitude information of the user standing on the pedal 12. For example, two flexible supports 14 can be arranged between the pedal 12 and the support frame 11. The first position sensor 13 can detect the attitude information of the user standing on the pedal 12 by detecting the deformation of the flexible supports 14. Alternatively, four flexible supports 14 can be arranged between the pedal 12 and the support frame 11. The first position sensor 13 may be arranged among the four flexible supports 14, and detect the deformation amounts of the flexible supports 14 with a balance position of each flexible support taken as a reference position for deformation measurements. By "balance position", it may mean the exact configuration or state of each flexible support when the user is standing on the pedal and the gravitational pull of earth on the user is balanced with the vertical component of the support force or normal force of the pedal (in the vertical direction the user is in a state of equilibrium since there is no movement in the vertical direction). Thus, the flexible support would be deformed to a certain degree in response to the pressure exerted by the user to the pedal, and the exact deformation condition of each flexible support will be referenced as the initial condition based on which the deformation amounts will be calculated to generate the signals for controlling the motions of the human-machine interaction vehicle. In another example, the user can lean forward or backward when standing on the pedal 12 and the pedal 12 can be such rotatably connected to the support frame 11 that the pedal 12 can sway relative to the support frame 11 about the axis of the support frame 11, hence the pedal 12 would lean forward or backward to form a forward tilt or backward tilt angle with respect to the support frame 11. The first position sensor 13 can detect the rotation information of the pedal 12 about the axis of the support frame 11. And the vehicle body 10 may further include a second position sensor (not shown) configured to detect tilt information of the support frame 11 relative to the ground. The controller 16 may thus drive the all-attitude human-machine interaction vehicle 100 to move forward or backward based on the tilt information detected by the second position sensor, and drive the all-attitude human-machine interaction vehicle 100 to take turns based on the rotation information detected by the first position sensor 13. Alternatively, the first position sensor 13 may be a tracking ball (similar to a mouse tracking ball) placed into the space between the pedal 12 and the support frame 11. The tracking ball can roll in any directions. The attitude information of the user standing on the pedal 12 can thus be detected by detecting a position of the tracking ball relative to the pedal 12.

Figure 2A:
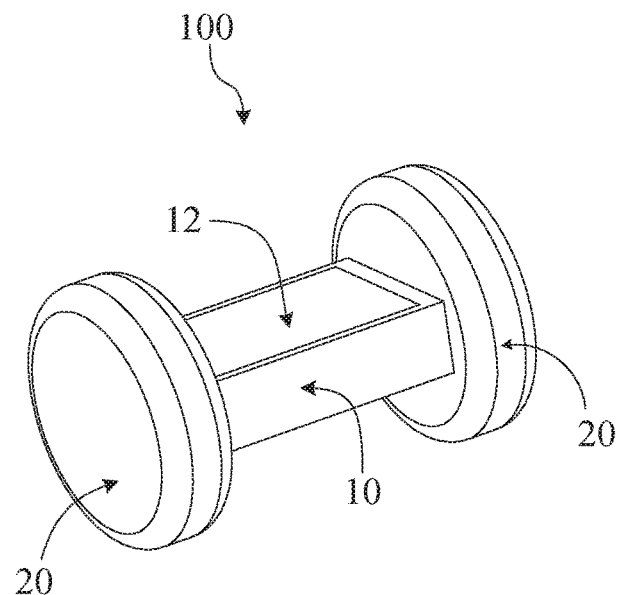
FIG. 2A illustrates a moving scenario of the all-attitude human-machine interaction vehicle according to the exemplary embodiment shown in FIG. 1, in which the all-attitude human-machine interaction vehicle moves straight forward or backward at a constant speed, while the vehicle body and the pedal stays horizontal.
Figure 2B:
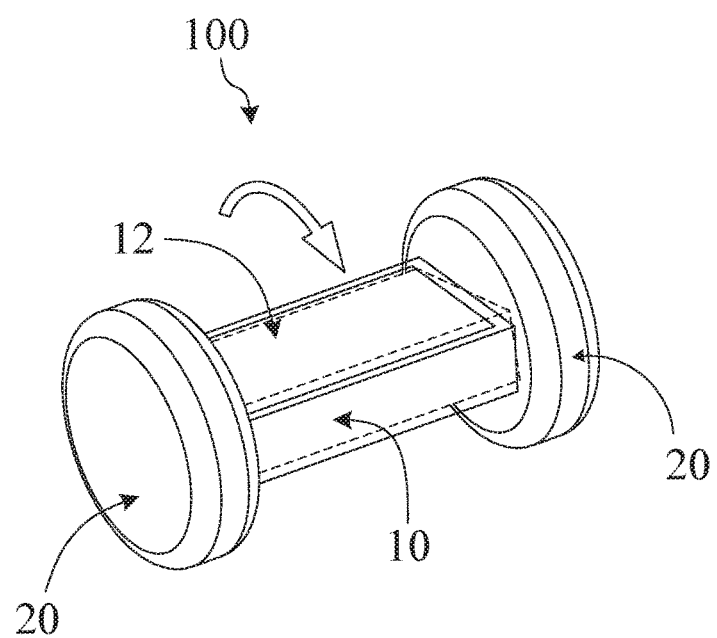
FIG. 2B illustrates another moving scenario of the all-attitude human-machine interaction vehicle according to the exemplary embodiment shown in FIG. 1, in which the all-attitude human-machine interaction vehicle accelerates forward, while the vehicle body tilts forward accordingly.
Figure 2C:
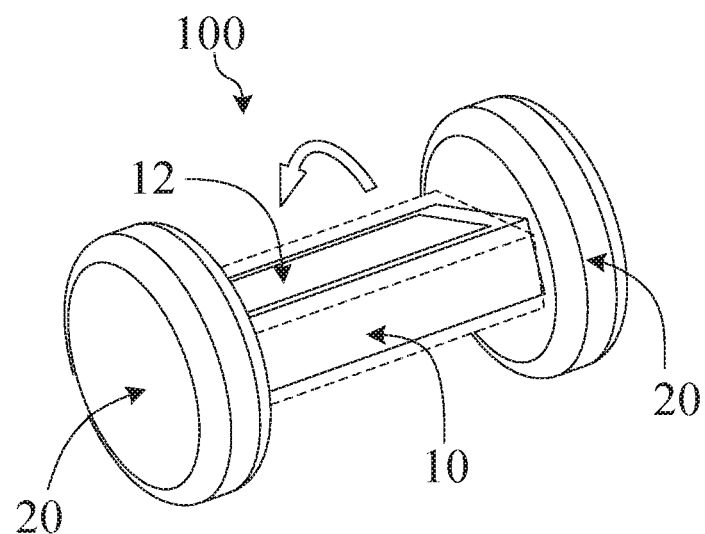
FIG. 2C illustrates yet another moving scenario of the all-attitude human-machine interaction vehicle according to the exemplary embodiment shown in FIG. 1, in which the all-attitude human-machine interaction vehicle accelerates backward, while the vehicle body tilts backward accordingly.

Referring now to FIGS. 2A-2C, in which different moving scenarios of the all-attitude human-machine interaction vehicle according to the exemplary embodiment as shown in FIG. 1 are illustrated. In the scenario as shown FIG. 2A, the vehicle 100 may drive forward or backward at a constant speed, which may indicate that no acceleration occurs, so both the vehicle body 10 and the pedal 12 may stay horizontal (suppose it is driving on a horizontal ground). By remaining the vehicle body 10 horizontal, the vehicle 100 can be informed that the driver wishes the vehicle to move on at a constant speed, so that the vehicle could produce the traction that is balanced by the friction with the ground. Likewise, by staying the pedal 12 horizontal, the vehicle 100 can be informed to remain its moving direction without taking turns, i.e., to move in a straight line, so that the two wheels 20, which are able to move independently of each other, may spin at exactly the same speed, thus enabling the vehicle to move on always towards the same direction and so maintains on a straight line.

The vehicle 100 can move forward or backward, for example, the vehicle 100 as shown in FIG. 2 is moving forward, while the vehicle body 10 leans forward to a certain extent. On one hand, by leaning the vehicle body 10 forward (for example, the driver can press his forefeet downward thus forcing the vehicle body to rotate around an axis of the two wheels 20 and as a result the vehicle body 10 will move from the position denoted by the dashed-lines to the position shown by solid lines, thus it creates a first difference in height on the pedal 12 along the shaft 15 from the solid lines to the dashed-lines), the vehicle 100 can be signaled to increase its speed and thus produce an acceleration. On the other hand, as with the scenario illustrated in FIG. 2A, by keeping the pedal 12 parallel with the vehicle body 10, i.e., the pedal 12 will not rotate about its width ways symmetric axis (perpendicular to the axis of the wheels), such that the vehicle 100 can be informed to maintain the direction of movement, i.e., it will not take turns, and this can be achieved by keeping the speeds of the two independent wheels consistent, that is, the two wheels will drive at the same speed, and will accelerate or decelerate synchronously. Likewise, referring now to FIG. 2C, when the vehicle 100 drives backwards, the vehicle body 10 can lean backwards (move from the previous position denoted by the dashed-lines to the current position shown in solid lines, thus it creates another first difference in height on the pedal 12 along the shaft 15 from the solid lines to the dashed-lines) to signal the vehicle 100 to increase its backward speed without taking turns. It is noteworthy that when the vehicle 100 is driving forward, when the driver forces the vehicle body 10 to tilt backwards, then the vehicle can be signaled to produce a deceleration, that is, the vehicle may reduce its forward speed until it stops.

Figure 3A:
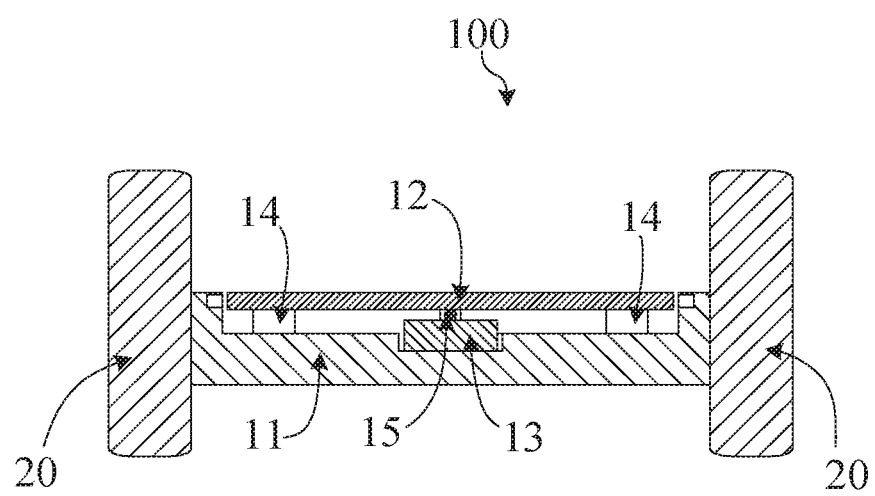
FIG. 3A illustrates a moving scenario of the all-attitude human-machine interaction vehicle according to the exemplary embodiment shown in FIG. 1, in which the all-attitude human-machine interaction vehicle moves forward or backward in a straight line without turning.
Figure 3B:
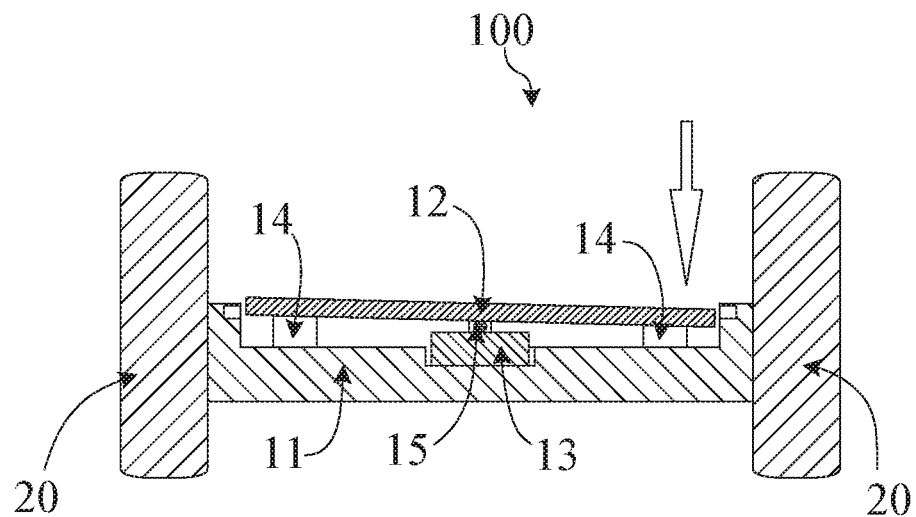
FIG. 3B illustrates another moving scenario of the all-attitude human-machine interaction vehicle according to the exemplary embodiment shown in FIG. 1, in which the all-attitude human-machine interaction vehicle turns right when the vehicle drives towards the reader or turns left when it is driving away.
Figure 3C:
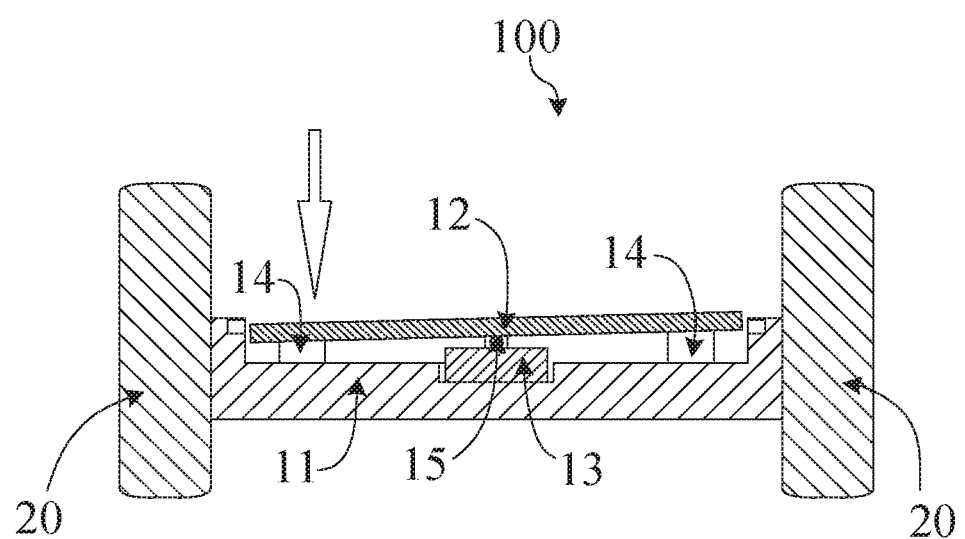
FIG. 3C illustrates yet another moving scenario of the all-attitude human-machine interaction vehicle according to the exemplary embodiment shown in FIG. 1, in which the all-attitude human-machine interaction vehicle turns left when the vehicle drives towards the reader or turns right when it drives away.

FIGS. 3A-3C illustrate different moving scenarios of the all-attitude human-machine interaction vehicle according to the exemplary embodiment shown in FIG. 1. In the scenario shown in FIG. 3A, the vehicle 100 may drive forwards or backwards (it actually has the same state of motion with the scenario as shown in FIG. 2A). Now suppose the vehicle 100 drives forwards and the forward direction is one towards the reader, i.e., the vehicle 100 drives towards the reader, then as with the scenario shown in FIG. 2A, the vehicle 100 may move forwards on a straight line without taking turns. In the scenario shown in FIG. 3B, however, the driver may push his left foot against the corresponding flexible supports 14 (there are two flexible supports 14 on the left side of the driver) a little harder than the right foot, thus forcing the pedal 12 to rotate about its widthways symmetrical axis, causing the flexible supports 14 to experience different pressure and thus result in different degrees of deformation. And the vehicle 100 can then be signaled to turn left, and this is achieved by driving the two independent wheels at different speeds; for example, either the left wheel may lower its speed or the right wheel may increase its speed, thus enabling the right wheel to outrun the left wheel. Likewise, referring to FIG. 3C, by pushing the right end of the pedal 12 against the corresponding supports 14 a little harder than the left end and thus deforming the supports 14 at the right side to a larger degree than at the left side, the vehicle can be signaled to turn right. Note, throughout the scenarios shown in FIGS. 3A-3C, the first position sensor 13 embedded inside the shaft 15 can be used to detect the amount of deformation of these flexible supports 14, and base on the acquired deformation information to generate and transfer a driving signal to the controller 16 to move the vehicle 100 in the manner indicated by the driving signal. In FIGS. 3B and 3C, the human-machine interaction vehicle 100 takes turns there is a second difference in height on the pedal 12 along a direction perpendicular to the shaft 15.

In some embodiments, when the support frame 11 is a rigid shaft 15, opposite ends of the rigid shaft can be rotatably connected to the two wheels 20. In this case, the rigid shaft 15 can be sheathed in the pedal 12. The first position sensor 13 can be arranged between the pedal 12 and the support frame 11, and detect the attitude information of the user standing on the pedal 12 by detecting a rotation angle of the pedal 12 relative to the rigid shaft 15.

In an exemplary embodiment, the vehicle body 10 of the all-attitude human-machine interaction vehicle 100 may include an inductive switch (not shown) disposed in the pedal area. The inductive switch can detect whether the pedal 12 is pressed or not, thereby controlling the wheels 20 to rotate or stop. Specifically, the all-attitude human-machine interaction vehicle 100 may only be started when the inductive switch is evenly pressed by the pedal 12. This can prevent the user from being hurt because the wheels 20 of a prior all-attitude human-machine interaction vehicle 100 may rotate simultaneously when the user is standing on the pedal 12. Furthermore, the inductive switch may include a pressure sensor and a photoelectric sensor, both can detect whether the pedal 12 is pressed or not.

The vehicle body 10 may further include a power source (not shown) and an actuation device (not shown). The power source may supply electrical energy to the actuation device, the first position sensor 13, and the controller 16. The controller 16 can control the power source, the actuation device, and the first position sensor 13, and send an actuation signal to the actuation device based on the tilt information detected by the first position sensor 13 and the second position sensor, thereby driving the wheels 20 to rotate. Typically, the vehicle body 10 may include two actuation devices respectively assembled in the two wheels 20 to control the corresponding wheels 20.

Figure 4A:
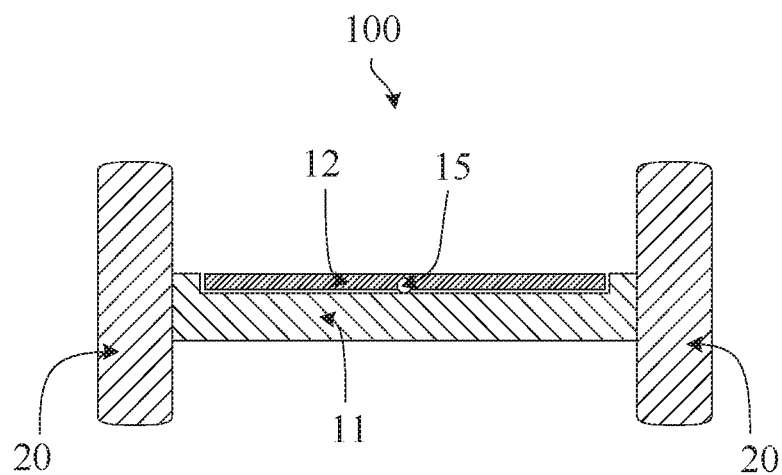
FIGS. 4A-4B illustrate different configurations of the all-attitude human-machine interaction vehicle according to the exemplary embodiment shown in FIG. 1, depending on the shape of the pedal.

FIG. 4A shows another configuration of the all-attitude human-machine interaction vehicle according to the exemplary embodiment shown in FIG. 1. As shown in FIG. 4A, the pedal 12 may have a flat upper surface and there is a tiny gap reserved between the pedal 12 and the vehicle body 10, which more closely reveals the actual configuration of the vehicle, since the pedal 12 may conduct only tiny motions relative to the vehicle body 10 (i.e., rotate about the shaft 15), and these tiny motions would suffice to generate the turning signals, based on which the vehicle 100 can take turns. In addition, the majority of the shaft 15 can be embedded into the pedal 12. By the small-gap and embedded-shaft configuration, the stability of the vehicle can be further enhanced. The first position sensor 13 may be mounted in any place of the pedal 12 or support frame 11.

Figure 4B:
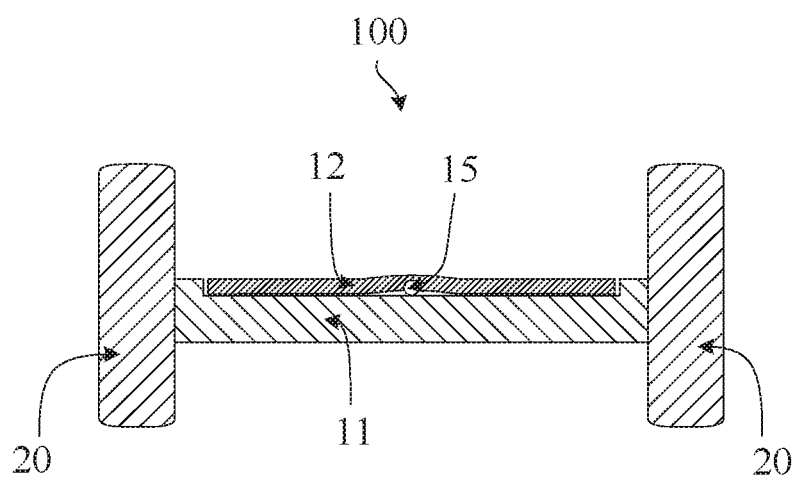

FIG. 4B shows another configuration of the all-attitude human-machine interaction vehicle according to the exemplary embodiment as shown in FIG. 1. This configuration differs from FIG. 4A in that the central part of the pedal 12 is ridged above. Also, the majority of the shaft 15 can be embedded into the pedal 12.

Note, in the configurations as shown throughout FIGS. 4A-4B, the first position sensor 13 can be integrated with the shaft 15 and can thus detect the attitude information of the driver by measuring the motion of the pedal 12 with respect to the shaft 15.

In the above description, the first position sensor 13 or the second position sensor can comprise, but is not limited to, a Hall sensor, an optical encoder, or a gyroscope, which can detect the rotation angle of the pedal relative 12 relative to the support frame 11 or that of the support frame 11 relative to the ground.

In conclusion, the all-attitude human-machine interaction vehicle 100 can detect the attitude information of a user standing on the pedal 12 and drive the wheels 20 to rotate based on the attitude information. More to the point, sitting or even standing on one foot, the user can still manipulate the all-attitude human-machine interaction vehicle 100, which further adds to the fun in manipulation.

The description above is merely exemplary embodiments of present disclosure, but is not intended to limit the disclosure. Any modifications, substitutions, or improvements made without departing from the spirits and scope of the disclosure shall all fall within the protection of the disclosure.

What is claimed is:

1. A human-machine interaction vehicle comprising a vehicle body and two wheels coupled with the vehicle body, wherein the vehicle body comprises a support frame, a shaft arranged substantially perpendicular to an axis of the two wheels, a pedal rotatably connected on the support frame about the shaft, a first position sensor, and a controller, wherein the shaft is embedded into the pedal, wherein the first position sensor is configured to detect attitude information of a user standing on the pedal, the controller is configured to drive the wheels to rotate based on the detected attitude information, and the human-machine interaction vehicle takes turns when the pedal rotates about the shaft;

wherein the first position sensor is a tracking ball placed into a space between the pedal and the support frame with a capability of freely moving in arbitrary directions in the space, and the attitude information of the user standing on the pedal is detected by detecting a relative position of the tracking ball with respect to the pedal.

2. The human-machine interaction vehicle of claim 1, wherein the pedal is disposed in a single pedal area defined in the support frame.

3. The human-machine interaction vehicle of claim 2, wherein the first position sensor comprises a pressure sensor configured to detect the attitude information of the user standing on the pedal by detecting pressures exerted on different parts of the pressure sensor.

4. The human-machine interaction vehicle of claim 2, wherein the first position sensor is arranged between the pedal and the support frame, and the pedal is swayed about the first position sensor such that opposite ends of the pedal approach or leave from the support frame, respectively.

5. The human-machine interaction vehicle of claim 4, wherein the first position sensor comprises a flexible structure configured to detect the attitude information of the user standing on the pedal by detecting deformation amounts at different orientations of the flexible structure.

6. The human-machine interaction vehicle of claim 5, wherein the pedal area is a receiving groove recessed towards an inside of the support frame; and a protrusion is provided at each side of the pedal, facing towards the wheels, and being pivoted to the vehicle body.

7. The human-machine interaction vehicle of claim 6, wherein the vehicle body further comprises a plurality of flexible supports arranged between the pedal and a bottom of the receiving groove.

8. The human-machine interaction vehicle of claim 1, wherein the support frame is a rigid shaft, which is sheathed in the pedal, and opposite ends of the support frame are rotatably connected to the two wheels.

9. The human-machine interaction vehicle of claim 8, wherein the first position sensor is arranged between the pedal and the support frame, and is configured to detect a rotation angle of the pedal relative to the support frame.

10. The human-machine interaction vehicle of claim 2, wherein the vehicle body further comprises at least two flexible supports arranged between the pedal and the support frame.

11. The human-machine interaction vehicle of claim 10, wherein the first position sensor is configured to detect the deformation of the flexible supports to detect the attitude information of the user standing on the pedal.

12. The human-machine interaction vehicle of claim 2, wherein the pedal is rotatably connected to the support frame about a shaft which is arranged to be substantially a perpendicular bisector of an axis of the support frame facing the wheels, and the first position sensor is configured to detect rotation information of the pedal about the axis of the support frame.

13. The human-machine interaction vehicle of claim 12, wherein the vehicle body further comprises a second position sensor configured to detect a tilt angle of the support frame relative to the ground, and the controller drives the human-machine interaction vehicle to move forward or backward based on the tilt angle detected by the second position sensor, and controls the human-machine interaction vehicle to take turns based on the rotation information detected by the first position sensor.

14. The human-machine interaction vehicle of claim 1, wherein the two wheels are rotatably assembled to opposite sides of the support frame and planes of the two wheels are substantially parallel with each other, and a central part of the pedal is ridged above.

15. The human-machine interaction vehicle of claim 1, wherein an inductive switch is arranged in the pedal area and is configured to detect whether the pedal is pressed or not in order to control the wheels to rotate or stop.

16. The human-machine interaction vehicle of claim 15, wherein the inductive switch comprises at least one of a pressure sensor and a photoelectric sensor, both configured to detect whether the pedal is pressed or not.

17. The human-machine interaction vehicle of claim 1, wherein the vehicle body further comprises a power source and an actuation device, the power source configured to supply electrical energy to the actuation device, the first position sensor, and the controller, and the controller configured to control the power source, the actuation device, and the first position sensor, and to send an actuation signal to the actuation device based on attitude information detected by the first position sensor, to drive the wheels to rotate.

18. A human-machine interaction vehicle comprising a vehicle body and two wheels; the vehicle body comprising:
 a support frame connecting with the two wheels, wherein each wheel is attached to a lateral side of the support frame;
 a shaft;
 a pedal rotatably connected on the support frame about the shaft;
 a position sensor configured to detect attitude information of a user standing on the pedal; and
 a controller configured to drive the wheels to rotate based on the detected attitude information;
 wherein the shaft is embedded into the pedal;
 wherein the human-machine interaction vehicle moves forward or backward when there is a first difference in height on the pedal along the shaft, and the human-machine interaction vehicle takes turns when there is a second difference in height on the pedal along a direction perpendicular to the shaft;
 wherein the first position sensor is a tracking ball placed into a space between the pedal and the support frame with a capability of freely moving in arbitrary directions in the space, and the attitude information of the user standing on the pedal is detected by detecting a relative position of the tracking ball with respect to the pedal.

19. A human-machine interaction vehicle comprising a vehicle body and two wheels coupled with the vehicle body;
 the vehicle body comprising:
 a support frame connecting with the two wheels, wherein each wheel is attached to a lateral side of the support frame;
 a shaft;
 a pedal rotatably connected on the support frame about the shaft; and
 a position sensor configured to detect attitude information of a user standing on the pedal; and
 a controller configured to drive the wheels to rotate based on the detected attitude information;
 wherein the shaft is embedded into the pedal;
 wherein the human-machine interaction vehicle moves forward or backward when there is a first tilt angle between the pedal and an axis of the wheels, and the human-machine interaction vehicle takes turns when there is a second tilt angle between the pedal and the shaft;
 wherein the first position sensor is a tracking ball placed into a space between the pedal and the support frame with a capability of freely moving in arbitrary directions in the space, and the attitude information of the user standing on the pedal is detected by detecting a relative position of the tracking ball with respect to the pedal.

* * * * *